United States Patent
Xu et al.

(10) Patent No.: US 9,218,386 B2
(45) Date of Patent: Dec. 22, 2015

(54) DUAL LOCKING MECHANISM FOR A DOMAIN

(75) Inventors: Jianwu Xu, Dunwoody, GA (US); Larry Roddenberry, Atlanta, GA (US); Mehdi Khosravi, Johns Creek, GA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 669 days.

(21) Appl. No.: 13/292,644

(22) Filed: Nov. 9, 2011

(65) Prior Publication Data

US 2013/0018861 A1 Jan. 17, 2013

Related U.S. Application Data

(60) Provisional application No. 61/506,367, filed on Jul. 11, 2011.

(51) Int. Cl.
*G06F 17/00* (2006.01)
*G06F 17/30* (2006.01)

(52) U.S. Cl.
CPC ................ *G06F 17/30348* (2013.01)

(58) Field of Classification Search
CPC ............ G06F 17/30348; G06F 17/246; G06F 17/2247; G06F 17/30424; G06F 17/30876; G06F 17/20893; G06F 17/30023; G06F 8/71; G06F 8/20; G06F 8/60; G06F 8/65; G06F 8/61
USPC ......................................................... 707/694
See application file for complete search history.

(56) References Cited

U.S. PATENT DOCUMENTS

| | | | |
|---|---|---|---|
| 5,359,724 A * | 10/1994 | Earle | |
| 2005/0289143 A1* | 12/2005 | Oshri et al. | 707/8 |
| 2008/0243913 A1* | 10/2008 | Suvernev et al. | 707/103 R |

* cited by examiner

*Primary Examiner* — Jay Morrison
*Assistant Examiner* — Bruce Witzenburg
(74) *Attorney, Agent, or Firm* — Miles & Stockbridge PC

(57) ABSTRACT

One embodiment is directed to a method for controlling access to a domain. The method includes receiving a request from a workbook process for a shared lock on a primary lock file and a secondary lock file controlling access to the domain, and providing the shared lock(s) when there is not an exclusive lock. While the workbook process is still in progress, the method may further include receiving a request from a batch process for an exclusive lock on the primary lock file, immediately providing an exclusive lock on the primary lock file the batch process, receiving a request from the batch process for an exclusive lock on the secondary lock file, and providing the exclusive lock on the secondary lock file to the batch process when there is not a shared lock on the secondary lock file.

20 Claims, 4 Drawing Sheets

DUAL LOCKING MECHANISM FOR A DOMAIN

CROSS REFERENCE TO RELATED APPLICATIONS

This application claims priority from provisional application Ser. No. 61/506,367, filed on Jul. 11, 2011, the content of which is hereby incorporated by reference in its entirety.

FIELD

One embodiment is directed generally to a computer system, and, in particular, to a system and framework for the execution of batch operations on a server.

BACKGROUND INFORMATION

Application servers executing specialized application software, such as the retail predictive application server (RPAS) from Oracle Corporation, may store permanent records in a binary tree-based multi-dimensional database, which is called a "domain." The RPAS may be used, for example, to generate forecasts, develop trading plans, and analyze customer behavior. In a customer environment, RPAS users access and store subsets of the domain data in smaller multi-dimensional repositories called "workbooks." A workbook serves as a sandbox for the user. It allows users to execute business rules, run what-if scenarios, and slice and dice the data to visualize and validate results without requiring continuous access to domain data. Once a user is satisfied with the calculations and results in their workbook, the user commits the data back to the domain. Workbook interactions with the domain include three major operations: workbook build, workbook refresh, and workbook commit. Workbook build refers to the construction of a new workbook and the loading of a subset of the domain data into the workbook. Workbook refresh refers to the refreshing of the data in an existing workbook from the domain. Workbook commit refers to the saving of the workbook data back to the domain.

SUMMARY

One embodiment is directed to a computer program embodied on a computer readable medium. The computer program is configured to control a process to perform a process. The process includes receiving a request from a workbook process for a shared lock on a primary lock file controlling access to a domain, providing the shared lock on the primary lock file to the workbook process when there is not an exclusive lock on the primary lock file, receiving a request from the workbook process for a shared lock on the secondary lock file, providing the shared lock on the secondary lock to the workbook and releasing the shared lock on the primary lock file substantially immediately after providing the shared lock on the secondary lock file to the workbook process. The process may further include, while the workbook process is still in progress, receiving a request from a batch process for an exclusive lock on the primary lock file, substantially immediately providing an exclusive lock on the primary lock file the batch process, receiving a request from the batch process for an exclusive lock on the secondary lock file, and providing the exclusive lock on the secondary lock file to the batch process when there is not a shared lock on the secondary lock file.

DETAILED DESCRIPTION

One embodiment is directed to an intra-day enabler for an application server, such as RPAS. The intra-day enabler provides an infrastructure and framework for the execution of batch operations on a server domain while users actively work on their workbooks. In certain embodiments, an access control mechanism referred to as a "dual lock mutex" (DLM) is provided. The DLM uses primary and secondary lock files to manage exclusive access of the batch processes, such as advanced inventory planning (AIP) replenishment, to the domain in concert with the ongoing workbook operations.

An application server, such as RPAS, may include a locking infrastructure that allows multiple processes to access the same data set in the domain. As a result, two or more processes can read the same dataset concurrently. However, write-access is exclusive such that a dataset cannot be accessed for read or write if another process has a write lock on the same data. Data access control may be implemented using lock files. In a multi-process situation, processes compete for access to a set of data that is already accessed. If a process cannot take over the lock within a certain period (timeout period), a time-out notification is presented to the user for retrying the operation.

Generally, users build, refresh, and commit RPAS workbooks during the day. In a multi-user environment, this implies hundreds of access requests on the domain data. Previously, RPAS was unable to support batch-type operations on a domain that was subject to workbook interactions. A batch operation would fail if it could not take over the lock on a dataset that is already locked by workbook build, refresh, or commit operations. Administrators were, therefore, required to shut down the entire user community and block all workbook operations in order to be able to run batch operations over a domain. Consequently, all forms of batch operations were commonly scheduled on a nightly or weekend basis to avoid interrupting user interaction with the server.

Embodiments of the invention, however, allow for the execution of batch processes during daytime, peak hours while users actively perform workbook operations. According to certain embodiments, already initiated and ongoing workbook operations are allowed to complete before starting a batch process. Then, once the batch process has started, embodiments of the invention prevent the initiation of further workbook operations, but allow users to continue running workbook calculations and to submit commit requests which will be put into a queue. The commit requests that were queued are then executed after the batch process has completed.

Figure 1:
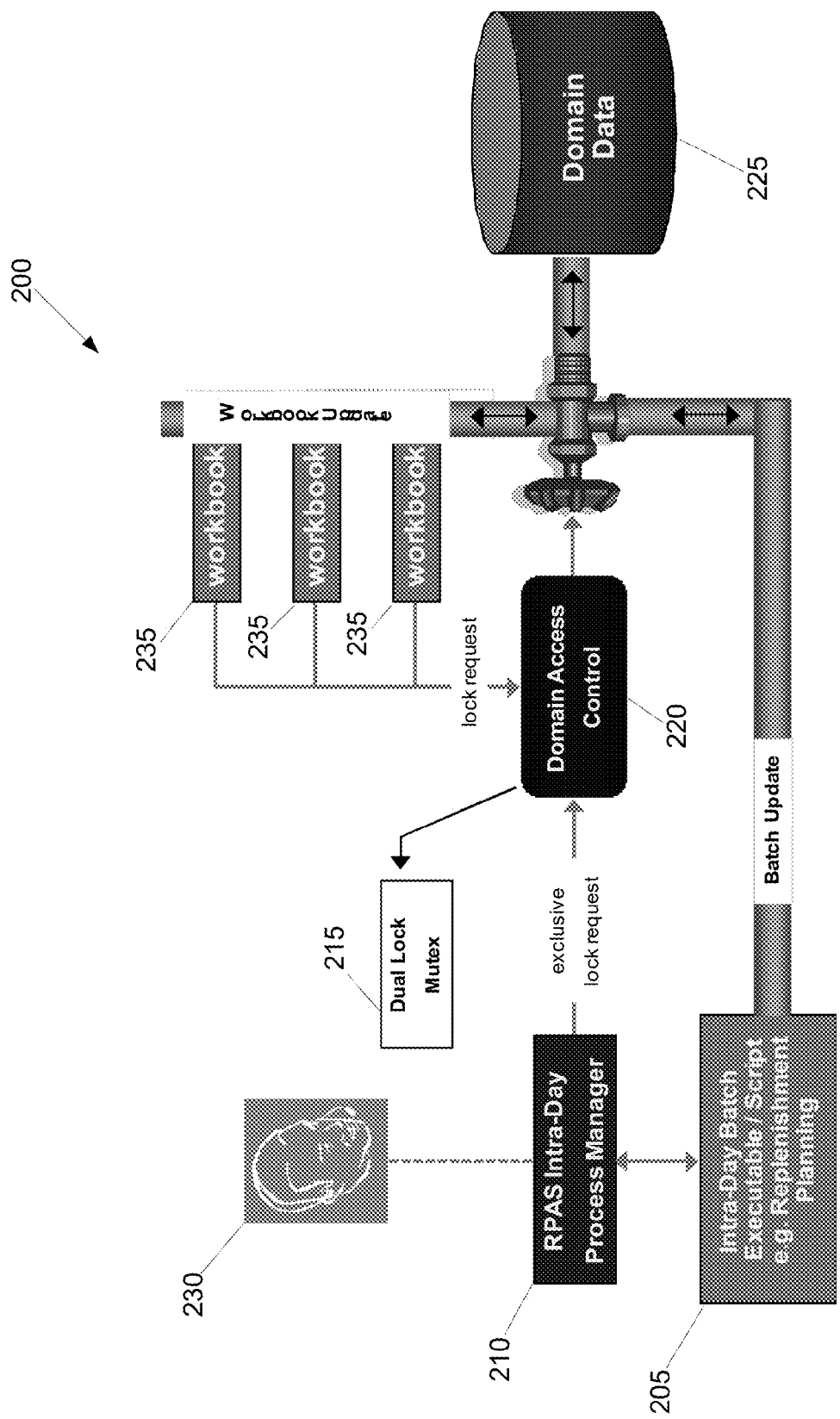
FIG. 1 illustrates a system according to one embodiment of the invention.

FIG. 1 illustrates a block diagram of a system or infrastructure 200 configured for concurrent execution of batch and workbook processes. In one embodiment, system 200 provides for the execution of batch operations on an RPAS domain without interruption to or from workbook operations. As illustrated in FIG. 1, system 200 includes a batch process 205 and an intra-day process manager 210. When batch process 205 is to be executed, batch process 205 notifies intra-day process manager 210. In some embodiments, administrator 230 may initiate the request to execute batch process 205. Alternatively, batch process 205 may automatically and/or periodically initiate a request to execute.

When intra-day process manager 210 is notified by administrator 230 or batch process 205 that it is ready to execute, intra-day process manager 210 sends an exclusive lock request to domain access control 220. In certain embodiments, domain access control 220 may utilize a dual lock mutex (DLM) 215 as an access control mechanism for controlling access to domain 225. DLM 215 utilizes primary and secondary lock files to manage exclusive access of batch process 205 to domain 225, as will be discussed in more detail below. In one embodiment, DLM 215 allows all ongoing workbook operations 235 to complete before beginning batch process 205.

Although a single domain 225 is illustrated in FIG. 1, two or more domains may be provided in accordance with other embodiments. For instance, according to one embodiment, a single master domain may be provided along with one or more local domains. According to certain embodiments a DLM 215 may be provided for the local domains and a separate DLM 215 for the master domain. As a result, only a subset of the local domains will be locked during the batch process.

The following is an example of computer program pseudo-code that may be executed by domain access control 220, for example, according to an embodiment:

```
-d <domain> (Refers to a local or master domain.)
-process <processName> | -script <scriptName>
[-timeout <minutes>] (The process will timeout if it cannot get access
    during this time. By default there is no timeout.)
- message <messageString> (Message presented to workbook user.)
[-wait <minutes>] (Time to wait before starting the process. Even if
    domain access is granted the process does not start until end of wait
    time. The default is 0.)
[-partitions <pos1, pos2,...>] (Partition positions (e.g., dept1, dept2,
    etc.) that determine local domains accessed by the batch process. If
    not provided, assumes all local domains as well as the master are
    accessed.)
[masterInBatch] (Indicates whether the master domain data is accessed by
    the batch process. In case of access, master domain will be
    included in the exclusive lock request. By default does not assume
    access to master.)
[-args <argumentString>] (Process or script arguments enclosed in double
    quotes.)
```

Figure 2:
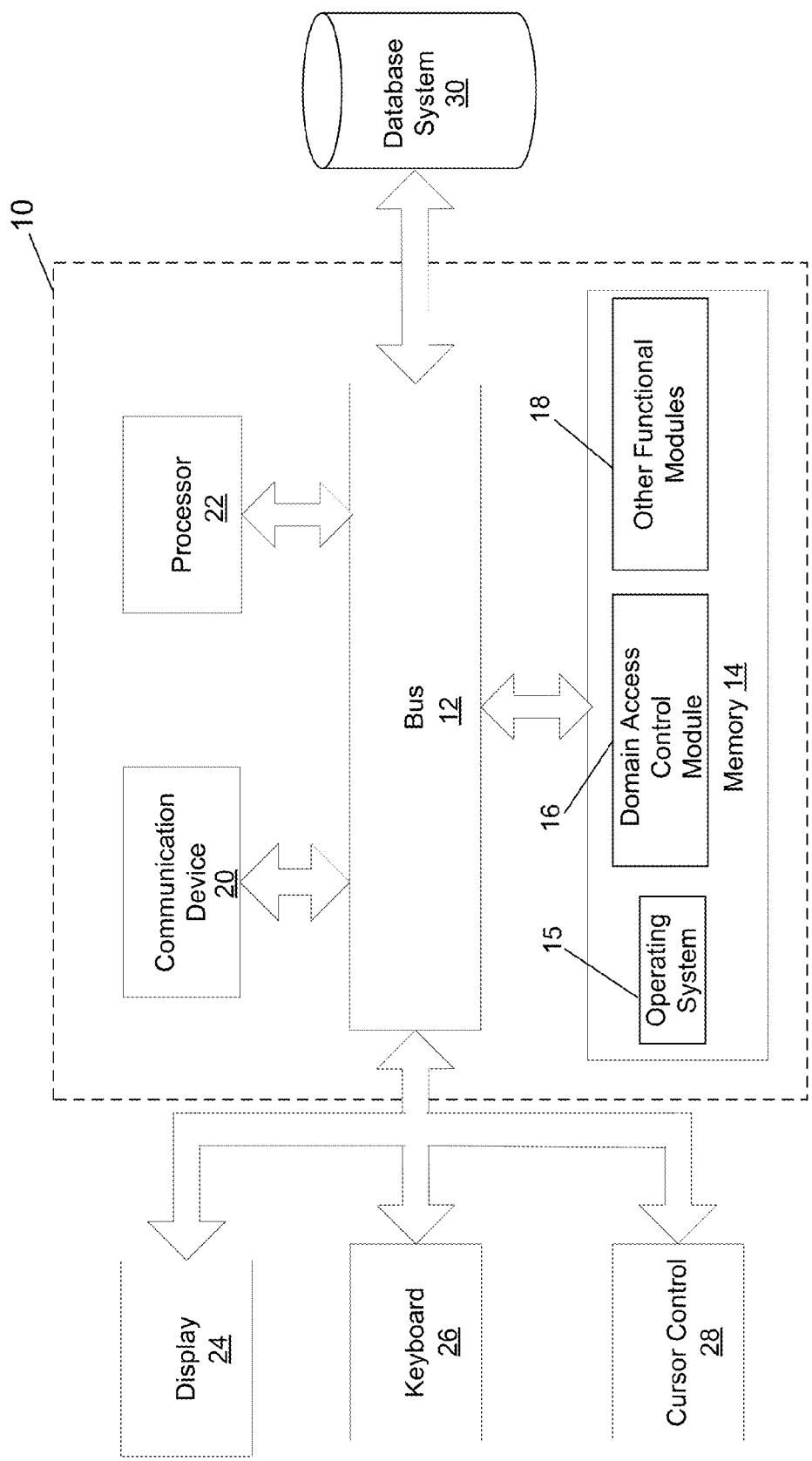
FIG. 2 illustrates a system according to another embodiment.

FIG. 2 illustrates a block diagram of a domain access control system 10 that allows for the execution of batch operations on a server domain while users actively work on their workbooks, according to one embodiment. In an embodiment, system 10 may be a RPAS intra-day enabler (RIDE) that includes an access control system. System 10 can include a bus 12 or other communications mechanism for communicating information between components of system 10. Alternatively, the components of system 10 may communicate with each other directly without the use of bus 12.

System 10 also includes a processor 22, coupled to bus 12, for processing information and executing instructions or operations. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer readable media. System 10 further includes a communication device 20, such as a network interface card or other communications interface, to provide access to a network. As a result, a user may interface with system 10 directly or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 may be coupled via bus 12 to a display 24, such as a Liquid Crystal Display ("LCD"), for displaying information or data to a user. A keyboard 26 and a cursor control device 28, such as a computer mouse, may be coupled to bus 12 to enable a user to interface with system 10.

Processor 22 and memory 14 may also be coupled via bus 12 to a database system 30 and, thus, may be able to access and retrieve information stored in database system 30. Although only a single database is illustrated in FIG. 1, any number of databases may be used in accordance with certain embodiments. In some embodiments, database system 30 may store retail and/or historical information that can be used to generate forecasts, develop trading plans, and analyze customer behavior. In one embodiment, database system 30 may be domain data 225 illustrated in FIG. 1.

In one embodiment, memory 14 stores software modules that provide functionality when executed by processor 22. The modules may include an operating system 15 that provides operating system functionality for system 10. The memory may also store a domain access control module 16, which can provide the functionality of managing the exclusive access of the batch processes to the domain. System 10 may also include one or more other functional modules 18 to provide additional functionality.

Database system 30 may include a database server and any type of database, such as a relational or flat file database. Database system 30 may store attributes related to retail customers and/or products. Database system 30 may also store any other data required by the domain access control module 16, such as domain data, or any other data associated with system 10 and its associated modules and components.

In certain embodiments, domain access control module 16, and other functional modules 18 may be implemented as separate physical and logical units or may be implemented in a single physical and logical unit. Furthermore, in some embodiments, domain access control module 16, and other functional modules 18 may be implemented in hardware, or as any suitable combination of hardware and software. In one embodiment, domain access control module 16 may be implemented in or execute the functionality of domain access control 220 of FIG. 1.

In one embodiment, domain access control module 16 is configured to control system 10 to perform a process of providing a batch process with exclusive access to the domain. When system 10 receives a request from a workbook process for a shared lock on a primary lock file of DLM 215, domain access control module 16 will provide the shared lock to the requesting workbook process if there is no exclusive lock on the primary lock file. For example, there may be an exclusive lock on the primary lock file when a batch process is operating. System 10 may then receive a request from the workbook process for a shared lock on a secondary lock file of DLM 215. Domain access control module 16 provides the workbook process with the shared lock on the secondary lock file.

If for any reason the shared lock on the secondary lock file cannot be granted to the workbook process, the workbook process will be denied operation and it must release the shared lock on the primary lock file immediately.

Domain access control module 16 is configured to release the shared lock on the primary lock file immediately after providing the shared lock on the secondary lock file to the workbook process. In some embodiments, domain access control module 16 holds the shared lock on the secondary lock file until the workbook process has completed. The shared lock on the secondary lock file is released as soon as the workbook process is complete.

According to an embodiment, while the workbook process is operating or in progress, system 10 may receive a request from a batch process for an exclusive lock on the primary lock file. Domain access control module 16 is configured to immediately provide the requesting batch process with the exclusive lock on the primary lock file. System 10 may then receive a request from the batch process for an exclusive lock on the secondary lock file. Domain access control module 16 is configured to determine whether the workbook process has completed and to provide the exclusive lock to the batch process once the workbook process has completed. Further, in one embodiment, domain access control module 16 is configured to hold the exclusive lock on both the primary and secondary lock files through completion of the batch process.

Figure 3:
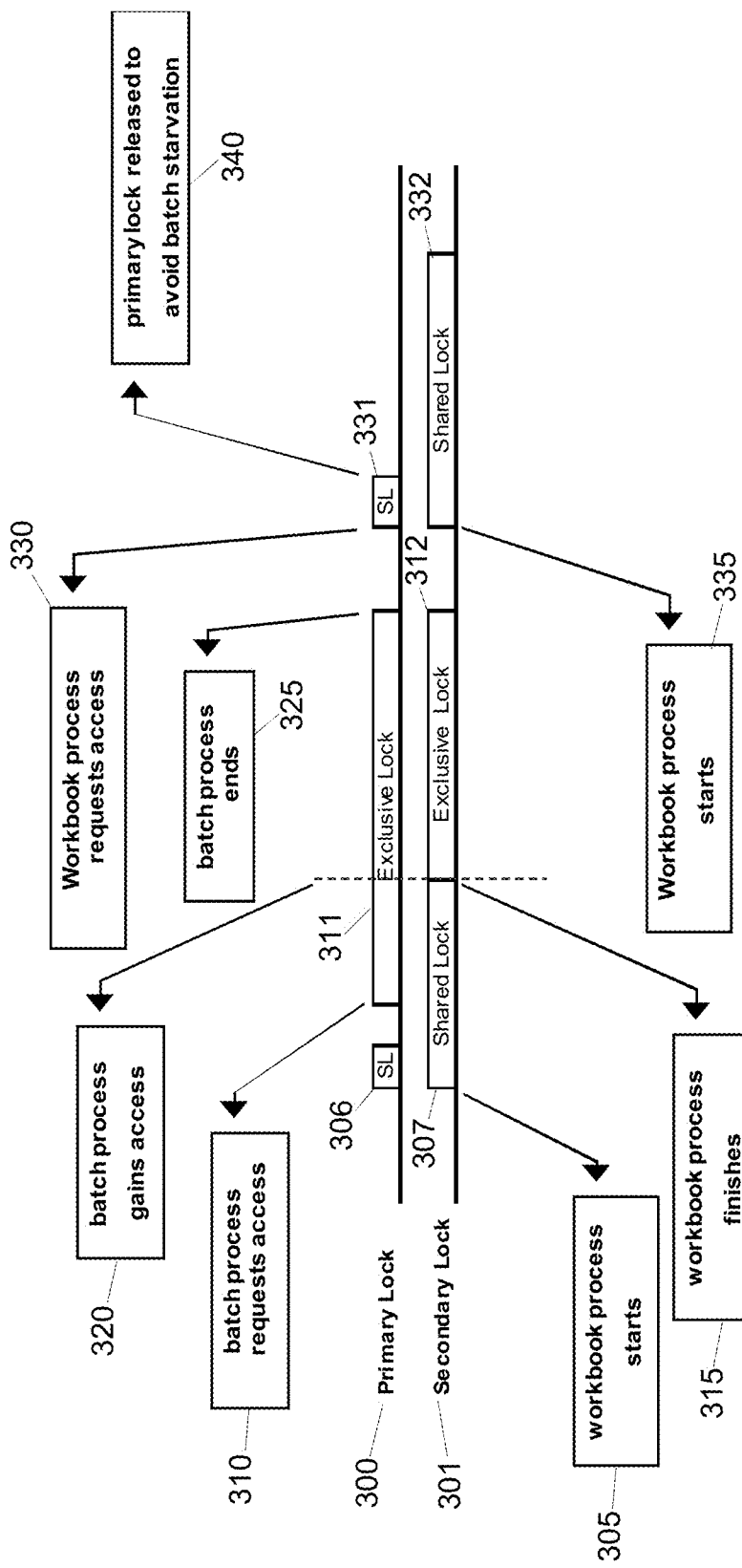
FIG. 3 illustrates a dual lock mutex according to one embodiment.

FIG. 3 illustrates the utilization of the primary lock files 300 and secondary lock files 301 of DLM 215, according to an embodiment. In the example illustrated in FIG. 3, a workbook process and batch process are attempting to access the domain data.

According to the example of FIG. 3, prior to requesting a shared lock on secondary lock file 301, the workbook process always checks primary lock file 300 by first requesting a shared lock on primary lock file 300. In the absence of an executing batch process, the workbook process is able to obtain a shared lock 306 on primary lock file 301 and a shared lock 307 on secondary lock file 301. Once the workbook process takes shared control 307 of secondary lock file 301, it immediately relinquishes control on primary lock file 300 and the workbook process starts at 305.

While the workbook process has started and is in progress, a request for a batch process may be received at 310. The request from the batch process will cause an immediate exclusive lock 311 on primary lock file 300. The ongoing workbook process is allowed to finish, and no other operation can start due to the batch process having an exclusive lock 311 on primary lock file 300. As soon as the workbook process is completed at 315, shared lock 307 on secondary lock file 301 is released. The batch process is then able to apply an exclusive lock 312 on the secondary lock file 301, and the batch process can access and process domain data at 320.

Once the batch process is completed at 325, it releases the exclusive locks 311 and 312 on primary lock file 300 and secondary lock file 301. As a result, subsequent workbook process can again access the domain data. For instance, a second workbook process may request access at 330, obtain a shared lock 331 on primary lock file 300, and obtain a shared lock 332 on secondary lock file 301. Then, at 340, the second workbook process releases the shared lock 331 on primary lock file 300 to avoid batch starvation.

Figure 4:
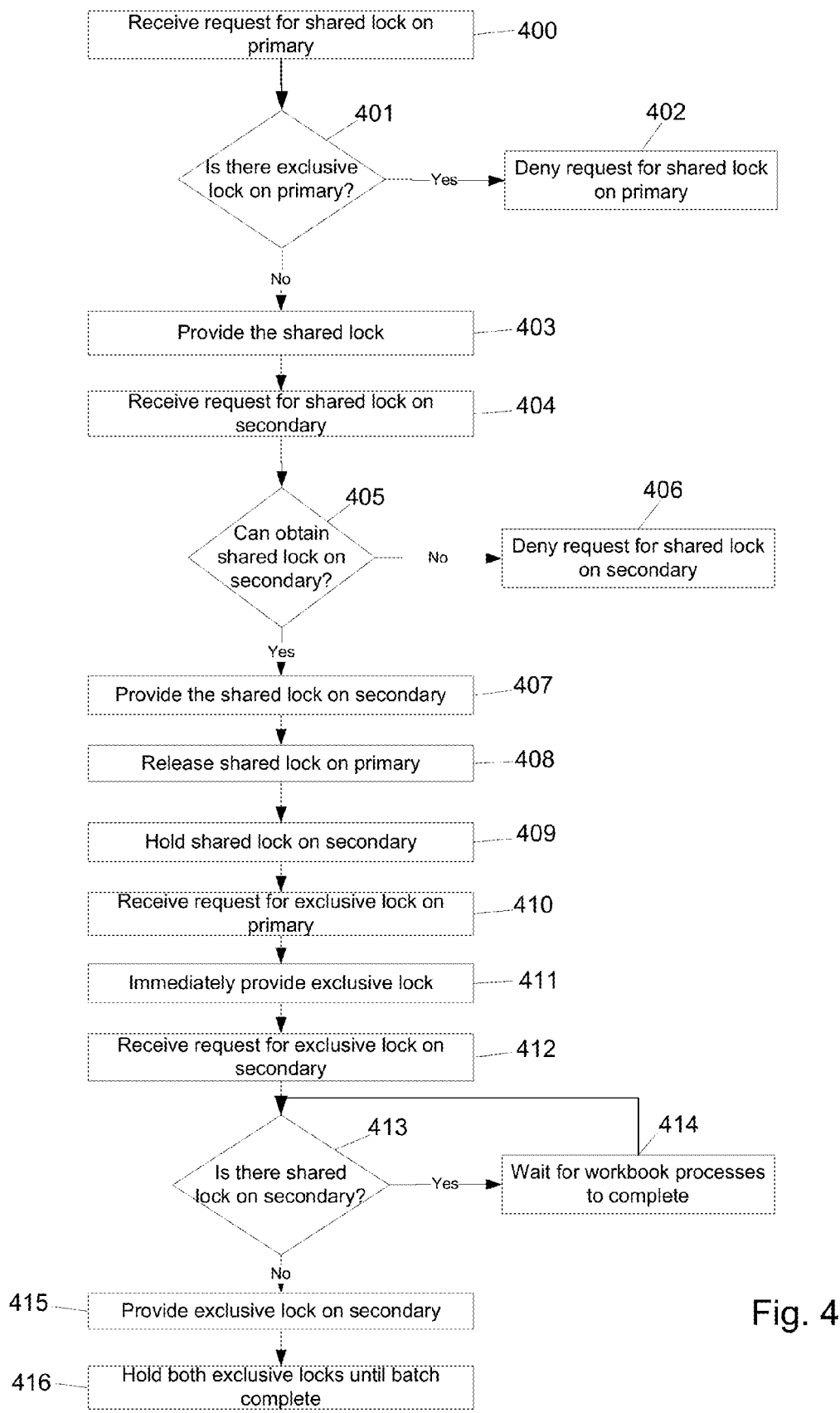
FIG. 4 illustrates a flow diagram of method according to one embodiment.

FIG. 4 illustrates a flow diagram of a method for controlling access to a domain, according to one embodiment. In certain embodiments, the functionality of the flow diagram of FIG. 4 is implemented by software stored in memory or other computer readable or tangible media of a server, and executed by a processor of the server. In other embodiments, the functionality may be performed by hardware (e.g., through the use of an application specific integrated circuit (ASIC), a programmable gate array (PGA), a field programmable gate array (FPGA), etc.), or any combination of hardware and software.

Referring to FIG. 4, at 400, a request is received from a workbook process for a shared lock on a primary lock file of a DLM. At 401, it is determined whether there is an exclusive lock on the primary lock file. If there is an exclusive lock on the primary lock file, then the request is denied at 402. If there is not an exclusive lock, then, at 403, the shared lock on the primary lock file is provided to the workbook process. At 404, a request is received from the workbook process for a shared lock on the secondary lock file. At 405, it is determined whether a shared lock on the secondary lock file can be provided, and, if for any reason it cannot be provided, then the request is denied at 406 and the shared lock on the primary lock file is released. Generally, if the workbook process is successfully able to obtain a shared lock on the primary lock file, then it should be able to obtain a shared lock on the secondary lock file. Embodiments of the invention, however, provide an error checking step at 405 to ensure that the workbook process is properly able to obtain a shared lock on the secondary lock file. According to one embodiment, if an error condition occurs and the workbook process cannot obtain a shared lock on the secondary lock file, then it should immediately release the shared lock it had already obtained on the primary lock file. The existence of an error condition may be indicative, for example, of hardware failure or access rights problems on the server.

If the shared lock on the secondary lock file can be provided, then, at 407, the shared lock on the secondary lock file is provided to the workbook process. Immediately after providing the shared lock on the secondary lock file to the workbook process, the shared lock on the primary lock file is released at 408. The shared lock on the secondary lock file is held, at 409, until completion of the workbook process.

At 410, a request may be received from a batch process for an exclusive lock on the primary lock file. The request from the batch process may be received while the workbook process is still in progress. At 411, an exclusive lock on the primary lock file is immediately provided to the requesting batch process. At 412, a request is received from the batch process for an exclusive lock on the secondary lock file. Then, at 413, it is determined whether there is a shared lock on the secondary lock file. If there is not a shared lock on the secondary lock file, then the batch process is provided with the exclusive lock on the secondary lock file at 415. If there is a shared lock on the secondary lock file, then, at 414, the process waits for the workbook process(es) to complete before proceeding to 413 and again checking whether there is a shared lock on the secondary lock file. At 416, both the exclusive locks on the primary and secondary lock files are held until completion of the batch process.

Based on the embodiments discussed herein, a system administrator can request exclusive access to a domain, such as an RPAS domain, for running a high priority batch process concurrent with intra-day operations. In the absence of this functionality, a system administrator would be required to shut down the domain and block the entire user community in order to run the batch processes on the domain. Prior to shutting down, administrators would need to provide lead time to all users so they could save their work and commit their changes before starting the batch operations. Users would be locked out from access to their workbooks for the entire time that the batch process was in progress.

However, as discussed above, embodiments of the present invention allow all the ongoing workbook operations that gain domain access prior to the batch process to complete. Therefore, the batch process execution will not cause abnormal termination of any of the workbook operations. Further, users will be able to use their workbooks and access domain data in all local domains not accessed by the batch process.

Additionally, embodiments provide a delayed start feature such that new workbook operations can be blocked ahead of the batch process. Although workbook operations may be blocked, certain embodiments allow users to submit commit requests during batch executions and such requests will be queued and executed after the batch process is completed. Moreover, embodiments of the invention allow workbook-specific operations that do not require domain access (edits, calculations, etc.) concurrent with the batch process. In this situation, users will receive a configurable message when they try to access domain data. In the event that the batch process is blocked by one or more workbook operations, information around the blocking process ID, localDomain ID, user ID, and operation type will be generated.

As a result, embodiments of the invention provide a useful framework to both administrators and users. There is no need for domain shutdown or for advance user notices, and no complete blockage of users. All users can continue workbook operations, such as running what-if scenarios, formatting, saving, and many other operations that do not require instant access to the domain.

It should be noted that many of the functional features described in this specification have been presented as modules, applications or the like, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be partially implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve its stated purpose.

Indeed, a module of executable code or algorithm could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A computer program, embodied on a non-transitory computer readable medium, the computer program configured to control a processor to perform a dual locking process for a domain, the dual locking comprising:
   creating primary and secondary lock files to manage exclusive access to the domain by a batch process and shared access to the domain by a plurality of concurrently-executing workbook processes, each workbook process operating on a local copy of at least a subset of the data stored in the domain, each workbook process performing at least one of a build operation, a refresh operation or a commit operation;
   in response to a request from a workbook process, providing a shared lock on the primary lock file to the workbook process when there is not an exclusive lock on the primary lock file;
   in response to a request from a workbook process holding a shared lock on the primary lock file, providing a shared lock on the secondary lock file to the first workbook process, releasing the shared lock on the primary lock file, and releasing the shared lock on the secondary lock file after the workbook process is completed;
   in response to a request from the batch process, providing an exclusive lock on the primary lock file to the batch process when there is not a shared lock on the primary lock file;
   while the batch process is holding the exclusive lock on the primary lock file, in response to a request from the batch process, providing an exclusive lock on the secondary lock file to the batch process after all of the shared locks on the secondary lock file have been released by the workbook processes; and
   while the batch process is holding the exclusive locks on the primary and secondary lock files, submitting workbook process commit operations to a queue for execution after the exclusive locks on the primary and secondary lock files have been released by the batch process.

2. The computer program according to claim 1, further comprising:
   holding both the exclusive lock on the primary lock file and the exclusive lock on the secondary lock file until completion of the batch process; and
   releasing both the exclusive locks at the same time when the batch process is completed.

3. The computer program according to claim 1, wherein the batch process can access the domain when all of the workbook processes are completed.

4. The computer program according to claim 1, wherein the shared lock or the exclusive lock on the secondary lock file results in access to the domain.

5. The computer program according to claim 4, wherein, when there is an exclusive lock on the primary lock file, no additional workbook processes can access the domain.

6. The computer program according to claim 4, further comprising allowing workbook processes to execute that do not require access to the domain during execution of the batch process.

7. The computer program according to claim 1, wherein the domain comprises a binary tree-based multi-dimensional database.

8. The computer program according to claim 1, wherein the dual locking further comprises:
   when the shared lock on the secondary lock file cannot be provided to the workbook process, denying the request for the shared lock on the secondary file and releasing the shared lock on the primary lock file.

9. The computer program according to claim 1, wherein the domain comprises a master domain and one or more local domains, and wherein separate primary and secondary lock files are provided for the master domain and each local domain.

10. An apparatus, comprising:
a processor; and
a domain access control module, wherein the domain access control module and the processor are configured to control the apparatus to perform a dual locking process comprising:
creating primary and secondary lock files to manage exclusive access to the domain by a batch process and shared access to the domain by a plurality of concurrently-executing workbook processes, each workbook process operating on a local copy of at least a subset of the data stored in the domain, each workbook process performing at least one of a build operation, a refresh operation or a commit operation;
in response to a request from a workbook process, providing a shared lock on a primary lock file to the workbook process when there is not an exclusive lock on the primary lock file;
in response to a request from the workbook process holding a shared lock on the primary lock file, providing a shared lock on the secondary lock file to the workbook process, releasing the shared lock on the primary lock file, and releasing the shared lock on the secondary lock file after the workbook process is completed;
in response to a request from a batch process, providing an exclusive lock on the primary lock file to the batch process when there is not a shared lock on the primary lock file;
while the batch process is holding the exclusive lock on the primary lock file, in response to a request from the batch process, providing an exclusive lock on the secondary lock file to the batch process after all of the shared locks on the secondary lock file have been released by the workbook processes; and
while the batch process is holding the exclusive locks on the primary and secondary lock files, submitting workbook process commit operations to a queue for execution after the exclusive locks on the primary and secondary lock files have been released by the batch process.

11. The apparatus according to claim 10, further comprising:
holding both the exclusive lock on the primary lock file and the exclusive lock on the secondary lock file until completion of the batch process; and
releasing both the exclusive locks at the same time when the batch process is completed.

12. The apparatus according to claim 10, wherein the batch process can access the domain when all of the workbook processes are completed.

13. The apparatus according to claim 10, further comprising:
denying the request for the shared lock on the primary lock file when there is an exclusive lock on the primary lock file.

14. The apparatus according to claim 10, wherein the domain comprises a binary tree-based multi-dimensional database.

15. The apparatus according to claim 10, wherein the apparatus is included in an application server.

16. The apparatus according to claim 10, wherein the dual locking process further comprises:
when the shared lock on the secondary lock file cannot be provided to the workbook process, denying the request for the shared lock on the secondary file and releasing the shared lock on the primary lock file.

17. A method for controlling access to a domain, the method comprising:
creating primary and secondary lock files to manage exclusive access to the domain by a batch process and shared access to the domain by a plurality of concurrently-executing workbook processes, each workbook process operating on a local copy of at least a subset of the data stored in the domain, each workbook process performing at least one of a build operation, a refresh operation or a commit operation;
in response to receiving a request from a workbook process, providing a shared lock on the primary lock file to the first workbook process when there is not an exclusive lock on the primary lock file;
in response to receiving a request from a workbook process holding a shared lock on the primary lock file, providing a shared lock on the secondary lock file to the first workbook process, releasing the shared lock on the primary lock file, and releasing the shared lock on the secondary lock file after the first workbook process is completed;
in response to a request from the batch process, providing an exclusive lock on the primary lock file to the batch process when there is not a shared lock on the primary lock file;
while the batch process is holding the exclusive lock on the primary lock file, in response to a request from the batch process, providing an exclusive lock on the secondary lock file to the batch process after all of the shared locks on the secondary lock file have been released by the workbook processes; and
while the batch process is holding the exclusive locks on the primary and secondary lock files, submitting workbook process commit operations to a queue for execution after the exclusive locks on the primary and secondary lock files have been released by the batch process.

18. The method according to claim 17, further comprising holding both the exclusive lock on the primary lock file and the exclusive lock on the secondary lock file until completion of the batch process.

19. The method according to claim 17, wherein the domain comprises a binary tree-based multi-dimensional database.

20. The method according to claim 17, further comprising:
when the shared lock on the secondary lock file cannot be provided to the workbook process, denying the request for the shared lock on the secondary file and releasing the shared lock on the primary lock file.

* * * * *